(12) United States Patent
Fournier (10) Patent No.: US 11,746,786 B2
(45) Date of Patent: Sep. 5, 2023

(54) LUBRICANT RECEPTACLE

(71) Applicant: LEYBOLD FRANCE S.A.S., Bourg-les-Valence (FR)

(72) Inventor: Patrick Fournier, Romans-sur-Isere (FR)

(73) Assignee: LEYBOLD FRANCE S.A.S., Bourg-les-Valence (FR)

( * ) Notice: Subject to any disclaimer, the term of this patent is extended or adjusted under 35 U.S.C. 154(b) by 188 days.

(21) Appl. No.: 17/438,170

(22) PCT Filed: Mar. 10, 2020

(86) PCT No.: PCT/EP2020/056356
§ 371 (c)(1),
(2) Date: Sep. 10, 2021

(87) PCT Pub. No.: WO2020/200665
PCT Pub. Date: Oct. 8, 2020

(65) Prior Publication Data
US 2022/0145887 A1 May 12, 2022

(30) Foreign Application Priority Data
Apr. 1, 2019 (DE) .......................... 202019101841.0

(51) Int. Cl.
*F04C 27/02* (2006.01)
*F04C 25/02* (2006.01)
(Continued)

(52) U.S. Cl.
CPC .............. *F04C 27/02* (2013.01); *B01D 45/14* (2013.01); *F04C 25/02* (2013.01); *F04C 29/026* (2013.01);
(Continued)

(58) Field of Classification Search
CPC .... F04C 27/02; F04C 29/026; F04C 2230/70; F04C 2230/85; B01D 45/14; B01D 46/00
See application file for complete search history.

(56) References Cited

U.S. PATENT DOCUMENTS 2,049,211 A   7/1936  Loweke
3,876,401 A * 4/1975  Sturgill .................. F04C 29/026
                                                         55/481
(Continued)

FOREIGN PATENT DOCUMENTS

CN    107806414 A    3/2018
CN    107842502 A    3/2018
DE      3501852 A1   8/1985

OTHER PUBLICATIONS

International Search Report dated Jul. 6, 2020 for PCT application No. PCT/EP2020/056356.

*Primary Examiner* — Mary Davis
(74) *Attorney, Agent, or Firm* — Ohlandt, Greeley and Perle, LLP (57) ABSTRACT

A lubricant receptacle for a vacuum pump is provided. The lubricant receptacle comprises a lubricant reservoir, a lubricant separator and an exhaust. A first gas connection is provided between a gas outlet of the lubricant reservoir and a gas inlet of the lubricant separator. For connecting a gas inlet of the lubricant reservoir with the vacuum pump, a second gas connection is provided, while a first lubricant connection is provided for connecting a lubricant outlet of the lubricant reservoir with the vacuum pump. Further, another lubricant connection is provided between a lubricant outlet of the lubricant separator and the lubricant outlet of the lubricant reservoir and/or an additional lubricant connection for connecting the lubricant outlet of the lubricant separator with the vacuum pump is provided. At least one of the gas connections and one of the lubricant connections is (Continued)

selectively coupleable. Furthermore, a vacuum pump system having such a lubricant receptacle and a vacuum pump is provided.

19 Claims, 10 Drawing Sheets

(51) Int. Cl.
      *F04C 29/02*       (2006.01)
      *B01D 45/14*       (2006.01)
      *B01D 46/00*       (2022.01)

(52) U.S. Cl.
    CPC .......... *B01D 46/00* (2013.01); *F04C 2230/70* (2013.01); *F04C 2230/85* (2013.01)

(56) References Cited

U.S. PATENT DOCUMENTS

| | | | |
|---|---|---|---|
| 5,209,653 A | 5/1993 | Murray et al. | |
| 6,579,335 B2 * | 6/2003 | Ollinger | F04C 29/026 |
| | | | 418/55.6 |
| 9,157,439 B2 * | 10/2015 | Brostrom | F04C 23/008 |

* cited by examiner

LUBRICANT RECEPTACLE

BACKGROUND

1. Field of the Disclosure

The disclosure relates to a lubricant receptacle for a vacuum pump, as well as to a vacuum pump having a lubricant receptacle. The vacuum pump particularly is a lubricant-sealed vacuum pump, particularly preferred a lubricant-sealed rotary vane pump. The lubricant receptacle preferably is a lubricant receptacle for such a vacuum pump.

2. Discussion of the Background Art

Vacuum pumps operated with a lubricant, such as e.g., rotary vane pumps, generally have integrated lubricant receptacles. Such lubricant receptacles serve e.g., to store lubricant, to separate lubricant from the fluid flow conveyed and to filter lubricant, etc. The lubricant used in most cases is oil. For the operation of conventional rotary vane pumps, for example, these have an oil tank, an oil separator, such as e.g., an air oil filter, an oil particulate filter and/or an oil cooling system.

Common maintenance work with respect to lubricant-sealed vacuum pumps comprise in particular a change of lubricant, such as e.g., an oil change, and/or the replacement of wear parts such as the filters, for example.

A number of problems arises during such maintenance work. For example, when oil is drained in the context of an oil change, it may happen that persons come into contact with the oil. This may result is health problems, e.g., because of the (high) temperature of the oil. In addition, inadvertent oil losses may occasionally occur so that oil escapes into the environment and thereby causes environmental pollution. Likewise, problems occur during filling or refilling fresh oil. In case of an improper filling, spilling and/or oil losses may occur, whereby the environment is also adversely affected and/or costs are incurred. If fresh oil is filled or present in insufficient quantities or if none is filled or present at all, a failure and/or wear of the vacuum pump occurs. Likewise, it is possible that replacement parts, such as e.g., filters, are not installed at all or improperly and that operation errors occur as a consequence.

It is an object of the disclosure to provide a lubricant receptacle, as well as a vacuum pump with a lubricant receptacle, wherein maintenance is optimized.

SUMMARY

The lubricant receptacle of the present disclosure for a vacuum pump is in particular a lubricant receptacle for lubricant-sealed vacuum pumps. It is particularly preferred that the lubricant receptacle is intended for a rotary vane pump. Preferably, it is an external lubricant receptacle, i.e. a lubricant receptacle external of the vacuum pump. In this context, an external arrangement in particular means that the lubricant receptacle is not rigidly, preferably not integrally, formed with the vacuum pump, and/or that the lubricant receptacle is not arranged within the housing of the vacuum pump. Preferably, the lubricant receptacle is an oil receptacle, since oil is most frequently used as the lubricant for vacuum pumps. As a consequence, the lubricant, as well as the lubricant components is/are oil or oil components, respectively. The lubricant receptacle has a lubricant reservoir. This lubricant reservoir in turn has a gas inlet, a gas outlet, a lubricant outlet, as well as preferably a lubricant inlet. These inlets and/or outlets and those described hereinafter are preferably openings that allow the inlet and outlet of respective fluids. In this respect, it is preferred that the respective inlets and/or outlets comprise valves, such as in particular check valves and/or switchable valves. Here, check valves are valves or fittings that allow a fluid flow in only one direction. Thus, it is preferred that inlets have a check valve configured such that the same only allows a fluid flow into the respective system or the respective component and provide for a shutoff in the opposite direction. Check valves used with outlets are correspondingly configured or arranged in the opposite manner. Gas inlets and/or gas outlets refer to inlets and outlets that do not only convey gas. The gas may also be a fluid, e.g., a vapor and/or lubricant mixture, etc. Here, gas in particular refers to a medium compressed by a vacuum pump. Further, the lubricant receptacle comprises a lubricant separator having a gas inlet, a gas outlet and a lubricant outlet. These as well as the other inlets and/or outlets can preferably be some sort of passage between one and another area. If, for example, in a preferred embodiment, the lubricant reservoir and the lubricant separator directly abut each other, so that no spatial separation, but rather only virtual or functional separation is possible, it is preferred that this separation area represents the inlets and/or outlets. The lubricant separator refers in particular to a device designed such that it allows lubricant to be separated from the gas flow conveyed. For this purpose, e.g., filters and/or devices for reducing the conveying speed and/or devices for gravity separation may be used in the context of lubricant separators. In addition, the lubricant receptacle comprises an exhaust connected, in particular in a gas-carrying manner, with the gas outlet of the lubricant separator. The exhaust preferably provides for the emission of the conveyed gas flow into the environment and/or a downstream device for receiving the conveyed gas flow. A first gas connection, i.e. a connection for conveying the gas flow, is provided between the gas outlet of the lubricant reservoir and the gas inlet of the lubricant separator. A second gas connection is provided between the gas inlet of the lubricant reservoir and the vacuum pump. The lubricant outlet of the lubricant reservoir is connected with the vacuum pump via a first lubricant connection. Further, another (second) lubricant connection is provided for connecting the lubricant outlet of the lubricant separator with the lubricant inlet of the lubricant reservoir. As an alternative or in addition to the further lubricant connection, an additional (third) lubricant connection is provided for connecting the lubricant outlet of the lubricant separator with the vacuum pump. The connections can preferably be some sort of passage between one and another area. If, for example, in preferred embodiments, the lubricant reservoir and the lubricant separator, and/or the lubricant reservoir and the vacuum pump, and/or the lubricant separator and the exhaust, directly abut each other, so that no spatial separation, but rather only virtual or functional separation is possible, it is preferred that this separation area represents a connection. At least one of the gas connections and at least one of the lubricant connections is configured to be selectively coupleable. In the context, selectively coupleable means in particular a connectable connection, so that a respective connection can be made e.g., manually, in particular temporarily. A gas connection or a lubricant connection in particular is a hose and/or a pipe for making a gas- or lubricant-carrying connection. In this context, "selectively coupleable" may in particular be configured such that a one-sided or a two-sided coupling is possible. Thus, if a connection is to be made between an inlet and an outlet, it is possible that, e.g., by means of a hose, only the inlet or the outlet is configured for coupling and e.g., the hose can be connected therewith. The hose, for example, may be fixedly fastened at the inlet or the outlet that is not coupleable.

It is preferred that the lubricant receptacle has one of the following configurations. A first configuration provides that the first gas connection, the first lubricant connection as well as preferably the additional (third) lubricant connection are configured to be selectively coupleable. In a second configuration, the first gas connection, the second gas connection, the first lubricant connection as well as preferably the further (second) and/or the additional (third) lubricant connection are selectively coupleable. A third configuration provides that the second gas connection, as well as preferably the further (second) and/or the additional (third) lubricant connection are configured to be selectively coupleable. A fourth configuration of the lubricant receptacle provides that the first gas connection, the second gas connection, the first lubricant connection as well as preferably the additional (third) lubricant connection are selectively coupleable. For all configurations it is preferred that the other, not coupleable gas connections and/or lubricant connections are configured to be fixedly connected. In this regard, it is particularly preferred that the fixed connection is integral, also referred to as a one-piece connection. If, accordingly, an inlet is fixedly connected with an outlet, this connection cannot be separated or connected (once more) in a non-destructive and/or a simple manual manner.

In a preferred embodiment the lubricant receptacle has a preferably single housing which accommodates the lubricant reservoir, as well as the lubricant separator. As an alternative, the lubricant receptacle has a housing accommodating the lubricant reservoir, as well as a housing accommodating the lubricant receptacle. As an alternative, it is also possible that the lubricant receptacle merely comprises one housing that accommodates the lubricant reservoir or the lubricant separator. The above described housings are, in particular, housings that do not correspond to the housing of the vacuum pump. According to the above definition regarding the housings, the following housing configurations are particularly preferred: a single housing for the lubricant reservoir and the lubricant separator; a housing for the lubricant separator, as well as a housing for the lubricant reservoir; a housing for the lubricant reservoir; or a housing for the lubricant separator. The inlets and/or outlets of the respective components are formed in particular on the respective housing. Thus, it is preferred that the inlet and/or outlet are provided as bores or openings of the housing. If the lubricant reservoir is provided e.g., in a lubricant reservoir housing, the lubricant reservoir housing has an opening for the gas inlet, an opening for the gas outlet, an opening for the lubricant outlet and/or preferably an opening for the lubricant inlet.

It is preferred that the selectively coupleable gas connections have a plug-in connection which is in particular a snap-in connector. If a respective connection is made e.g., by means of a pipe, the pipe may be inserted into the respective inlet or outlet and preferably snap in so that a connection is made. Preferably, the plug-in connection has a socket or a nipple or a sleeve, in particular a plug-in sleeve.

It is preferred that the selectively coupleable gas connections and/or the selectively coupleable lubricant connections are self-closing, in particular when the connection is decoupled. For this purpose, it is preferred that the connections and/or inlets and outlets respectively have check valves. If, for example, the lubricant connection of the lubricant reservoir with the vacuum pump is decoupled, no lubricant can escape from the vacuum pump and/or the lubricant reservoir and/or the lubricant connection due to the self-closing effect.

The lubricant reservoir in particular comprises a first chamber which is preferably connected with the lubricant inlet of the lubricant reservoir and/or the gas outlet of the lubricant reservoir. As an alternative or in addition to the first chamber, the lubricant reservoir has a lubricant filter system which is connected in particular with the lubricant outlet of the lubricant reservoir. The lubricant filter system in particular is an oil filter. As an alternative or in addition to the first chamber and/or the lubricant filter system, the lubricant reservoir has a lubricant tank which is connected in particular with the first chamber and/or the lubricant filter system. As an alternative or in addition to the first chamber and/or the lubricant filter system and/or the lubricant tank, the lubricant reservoir comprises a heat exchanger, wherein the heat exchanger is preferably arranged between the lubricant filter system and the lubricant outlet. The heat exchanger is configured, in particular, to be cooling the lubricant. Thus, the heat exchanger in particular provides for a temperature control of the lubricant to preferably an optimal operating temperature. The first chamber is preferably a high pressure chamber.

Preferably, the first chamber comprises a lubricant separator. The lubricant separator is in particular a gravity lubricant separator. Here, the lubricant separator is designed in particular such that lubricant is separated from the gas flow compressed by the vacuum by gravity and/or a reduction of the gas flow conveying speed. In this case, preferably larger droplets are separated from the gas flow.

In a preferred embodiment the lubricant separator comprises a lubricant separating system which is connected in particular with the gas inlet of the lubricant separator. As an alternative or in addition to the lubricant separating system, the lubricant separator comprises in particular a gas lubricant filter which is connected in particular with the lubricant separating system and/or the gas outlet of the lubricant separator. The gas lubricant filter preferably is a filter that filters out in particular fine lubricant droplets from gas flow lubricant compressed by the vacuum pump. As an alternative or in addition to the lubricant separating system and/or gas lubricant filter, the lubricant separator comprises in particular a lubricant recovery system which is preferably connected with the lubricant separating system and/or the gas lubricant filter. As an alternative or in addition to the lubricant separating system and/or the gas lubricant filter and/or the lubricant recovery system, the lubricant separator comprises in particular second chamber, wherein the second chamber is arranged preferably between the lubricant recovery system and the lubricant separating system and/or the gas lubricant filter. Preferably, the same pressure prevails in the second chamber that prevails in the environment of the lubricant receptacle and/or in the environment of the vacuum pump. Preferably, the second chamber is an ambient pressure chamber. It is particularly preferred that a further separation of lubricant from the gas flow is effected in the second chamber. It is possible that the first and second chamber form a single chamber.

The lubricant separating system preferably comprises The at least one lubricant separator preferably is a gravity lubricant separator or a filter or an impeller separator. With a plurality of lubricant separators, a combination of the mentioned devices is possible. In the context of the gravity lubricant separator, in particular a lubricant separation by gravity and/or by reduction of the conveying speed is effected.

It is preferred that the lubricant recovery system comprises a heat exchanger and/or a lubricant tank. The heat exchanger provides in particular for a lubricant cooling or a temperature control of the lubricant, preferably to an optimal operating temperature.

In a preferred embodiment the lubricant reservoir comprises at least one lubricant temperature sensor, wherein the lubricant temperature sensor is arranged in particular for temperature measurement in at least one of the lubricant tanks. Using the at least one lubricant temperature sensor, the temperature of the lubricant can be detected at the respective position so that in particular a temperature adjustment of the lubricant is possible subsequently.

Preferably, the lubricant receptacle comprises at least one lubricant level sensor. The at least one lubricant level sensor is preferably arranged in at least one of the lubricant tanks. Preferably, the lubricant receptacle further comprises a lubricant information device, via which, in particular cooperation with the at least one lubricant level sensor, a level indication can be indicated to a user or the like.

In a preferred embodiment, the lubricant receptacle comprises at least one contamination sensor, preferably in at least one of the lubricant tanks. Using the at least one contamination sensor it is possible in particular to detect water proportions in the lubricant tanks or in the lubricant. Such water proportions are due in particular to water vapor being conveyed via the vacuum pump, wherein water condenses from the water vapor during conveying.

In particular, the lubricant receptacle further comprises a pressure sensor in particular in the lubricant separator and/or in the lubricant reservoir to detect in particular the gas pressure.

The vacuum pump system of the disclosure in particular is a lubricant-sealed vacuum pump system. It is particularly preferred that it is a rotary vane pump system. The vacuum pump system preferably has a lubricant receptacle of the disclosure according to the above definitions. The vacuum pump system further comprises a vacuum pump, in particular a lubricant-lubricated vacuum pump, particularly preferred a rotary vane pump. The gas outlet of the vacuum pump is connected with the gas outlet of the lubricant reservoir via the second gas connection. The lubricant inlet of the vacuum pump is connected with the lubricant outlet of the lubricant reservoir via the first lubricant connection. It is further preferred that the lubricant inlet of the vacuum pump is connected with the lubricant outlet of the lubricant separator via the additional lubricant connection.

In a preferred embodiment, the gas outlet of the vacuum pump and/or the lubricant inlet of the vacuum pump are configured to be self-closing. Here, the self-closing configuration is designed in particular such that a self-closure, e.g., by means of a self-closing valve and/or a check valve, is effected as soon as the corresponding connection with the lubricant receptacle is decoupled.

BRIEF DESCRIPTION OF THE DRAWINGS

The disclosure is described in detail hereinafter with reference to preferred embodiments and to the accompanying drawings.

In the Figures.

DETAILED DESCRIPTION OF THE PREFERRED EMBODIMENT

Similar or identical components or elements are identified in the Figures by like reference numerals or variations thereof (e.g., 104 and 104', 104", etc.). For the sake of improved clarity, preferably already identified elements are not given reference numerals in all Figures. The (technical) symbols shown in the Figures have been chosen merely for exemplary illustration. Features not described, which elements in such illustrations may generally have, should particularly not be construed as being part thereof.

Figure 1A:
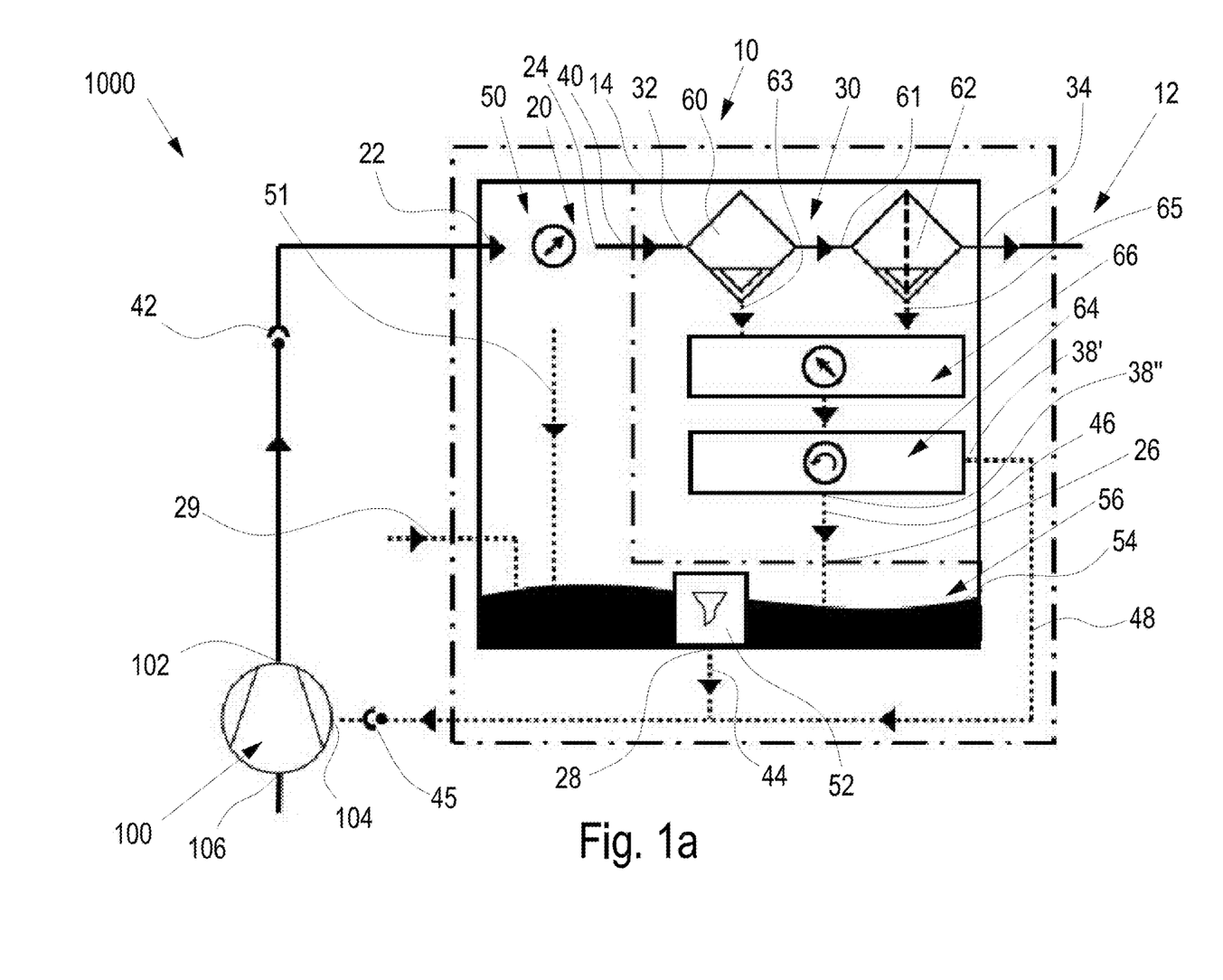
FIG. 1a is a schematic illustration of an embodiment of a vacuum pump system of the present disclosure comprising an embodiment of a lubricant receptacle of the present disclosure and a vacuum pump, FIGS. 1b and 1c schematic illustrations of further embodiments of vacuum pump systems of the disclosure with other embodiments of lubricant receptacles of the present disclosure and vacuum pumps, FIG. 2 a perspective schematic illustration of a vacuum pump system of the disclosure similar to the embodiment of the vacuum pump system of FIG. 1a, FIGS. 3a and 3b schematic illustrations of further embodiments of vacuum pump systems of the disclosure with other embodiments of lubricant receptacles of the present disclosure and vacuum pumps, FIG. 4 a perspective schematic illustration of an embodiment of a vacuum pump system of the disclosure similar to the embodiments of the vacuum pump system of FIGS. 3a and 3b, and FIGS. 5a, 5b and 6 further embodiments of vacuum pump systems of the disclosure with other embodiments of lubricant receptacles of the present disclosure and vacuum pumps.

FIG. 1a is a schematic illustration of an embodiment of a vacuum pump system 1000 comprising an embodiment of a lubricant receptacle 10 of the disclosure, as well as a vacuum pump 100.

The vacuum pump 100 has a gas inlet 106. In this and the other illustrations, the term "gas" should not be limited to gas only. Rather, this term refers to the fluid flow conveyed and compressed by the vacuum pump. Thus, the gas may e.g., also be vapor. In the schematic illustrations (FIGS. 1, 1b, 1c, 3a, 3b, 5a, 5b, 6) such gas compounds are represented as solid lines (e.g., 42), whereas lubricant connections or lines are illustrated as dotted lines (e.g., 48). By means of the gas inlet 106, the vacuum pump 100 may be connected to e.g., a recipient (not illustrated) to be evacuated. The compressed gas leaves the vacuum pump 100 from the gas outlet 102 and is directed to the lubricant receptacle 10 via the second gas connection 42. The second gas connection 42 is configured to be coupleable, so that a gas-carrying connection between the vacuum pump (100) and the lubricant receptacle 10 can be made e.g., via a plug-in connection.

As illustrated, the lubricant receptacle 10 has a single housing 14 which accommodates a lubricant reservoir 20 and a lubricant separator 30. The outer chain dotted line substantially delimits the lubricant receptacle 10, whereas the inner chain dotted line delimits the lubricant reservoir 20 from the lubricant separator 30.

The compressed gas coming from the vacuum pump enters a high pressure chamber 50 of the lubricant reservoir via the gas inlet 22. Due to gravity and/or reduction of the conveying speed, lubricant is separated from the inflowing gas flow and drops (represented by a broken line 51) into a lubricant tank 54. Instead of the implementation of the high pressure chamber 50 as high pressure chamber, it is also preferably possible to have a (standard) first chamber 50, in this and other embodiments.

In particular, the lubricant reservoir 20 illustrated (and/or the other, in particular illustrated embodiments) comprise a lubricant refill device 29, such as e.g., a selectively closeable refill opening. Via this refill opening 29 e.g., a user can manually refill lubricant into the lubricant reservoir 20 or the lubricant tank 54.

It is preferred that the lubricant reservoir 20 has a heat exchanger 56 for controlling the temperature of the lubricant. As illustrated, the heat exchanger 56 is of the type that functions only via the surface and the heat transmitted thereby to the environment.

In particular, a lubricant filter 52 is connected with the lubricant tank 54, by which the lubricant is filtered. Preferably, the filter (52) is configured such that it filters particles and/or water from the lubricant. After filtration, the lubricant leaves the lubricant reservoir 20 from a lubricant outlet 28 and is directed towards the vacuum pump 100 via a first lubricant connection 44.

The gas flow leaves the lubricant reservoir 20 via a gas outlet 24 and is guided onward to the lubricant separator 30 via a first gas connection 40. This first gas connection 40 (as well as other corresponding gas and/or lubricant connections in this and other illustrations) may be configured e.g., as hoses and/or pipes, but a direct connection, e.g., by flowing through a space and passing an imaginary border (see first gas connection 40 e.g., in FIG. 1a), is also possible in this context.

The gas flow guided through the first gas connection 40 enters the lubricant separator 30 via a gas inlet 32. Here, the gas flow first passes a lubricant separating system 50. Preferably, lubricant is separated in the lubricant separating system 60 by means of a (further) reduction of the conveying speed and/or by gravity. Starting from the lubricant separating system 60, the gas flow is guided onwards to a gas lubricant filter 62, in particular via a gas-carrying connection 61.

In the gas lubricant filter 62 the gas flow is filtered, in particular through a filter. Starting from the gas lubricant filter, the gas flow leaves the lubricant separator 30 from a gas outlet 34 and may escape from the lubricant receptacle 10 in particular via an exhaust 12.

The lubricant separated by the lubricant separating system 60 and/or the gas lubricating filter 62 preferably enters an ambient pressure chamber 66 e.g., via lubricant-carrying lines 63, 65. Starting from there, the lubricant is preferably guided to a lubricant recovery system 64. The lubricant recovery system 64 comprises in particular a lubricant-cooling heat exchanger and/or a lubricant tank. Instead of the implementation of the high ambient pressure chamber 66 as ambient pressure chamber, it is also preferably possible to have a (standard) second chamber 66, in this and other embodiments.

As illustrated, the lubricant leaves the lubricant separator 30 from the lubricant recovery system 64 via lubricant outlets 38', 38". Here, the lubricant is guided on the one hand into the lubricant reservoir 20 through a lubricant inlet 26 via another lubricant connection 46. On the other hand, the lubricant is guided towards the vacuum pump 100 via an additional lubricant connection 48.

The additional lubricant connection 48 coming from the lubricant separator 30, as well as the first lubricant connection 44 coming from the lubricant reservoir 20 merge, as illustrated, and are introduced into the lubricant inlet 104 of the vacuum pump via a coupleable lubricant connection 45.

Figure 1B:
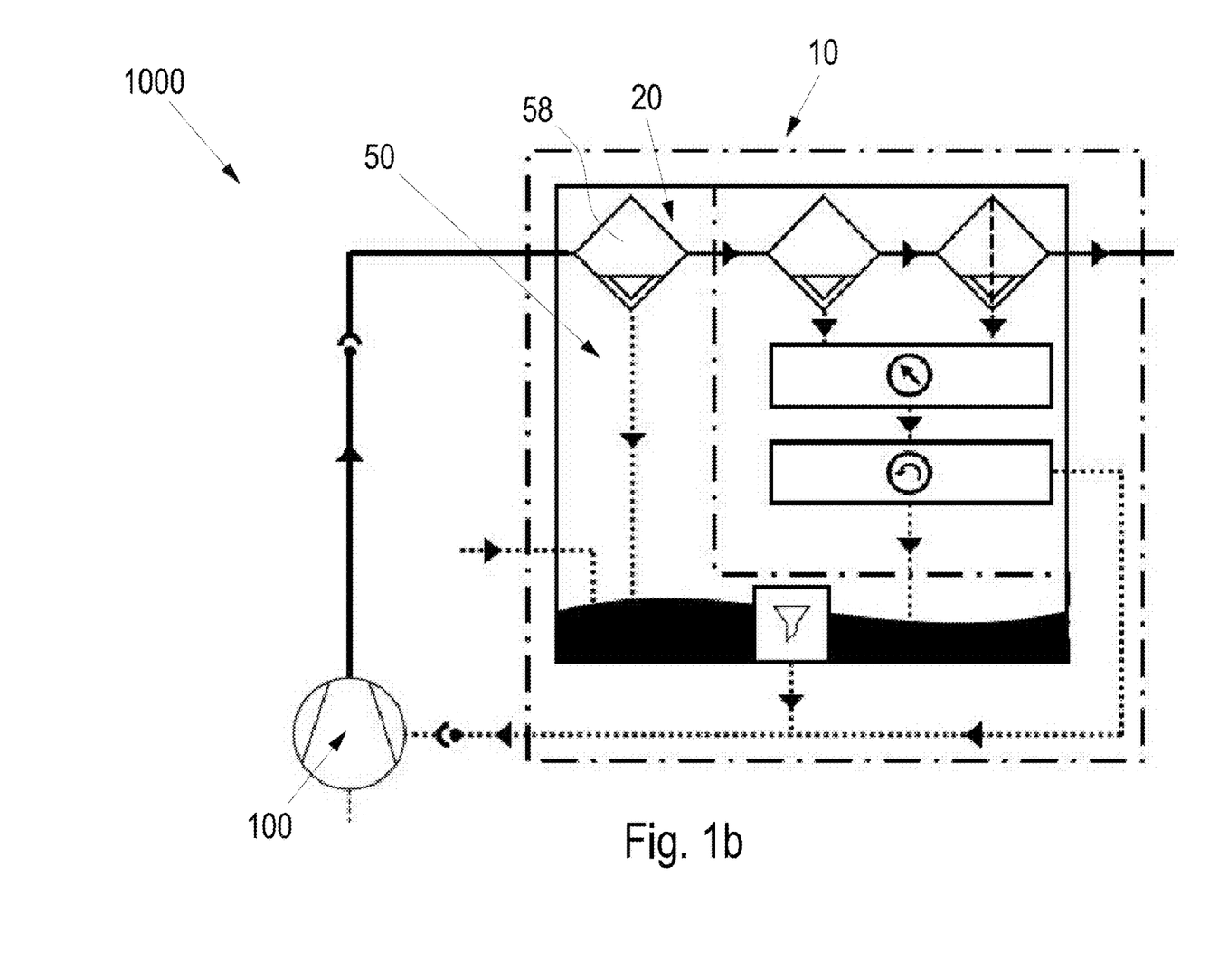

FIG. 1b illustrates another embodiment of a vacuum pump system 1000 according to the disclosure comprising an embodiment of a lubricant receptacle 10 of the present disclosure and a vacuum pump 100. The embodiments illustrated substantially correspond to the embodiment in FIG. 1a.

Figure 1C:
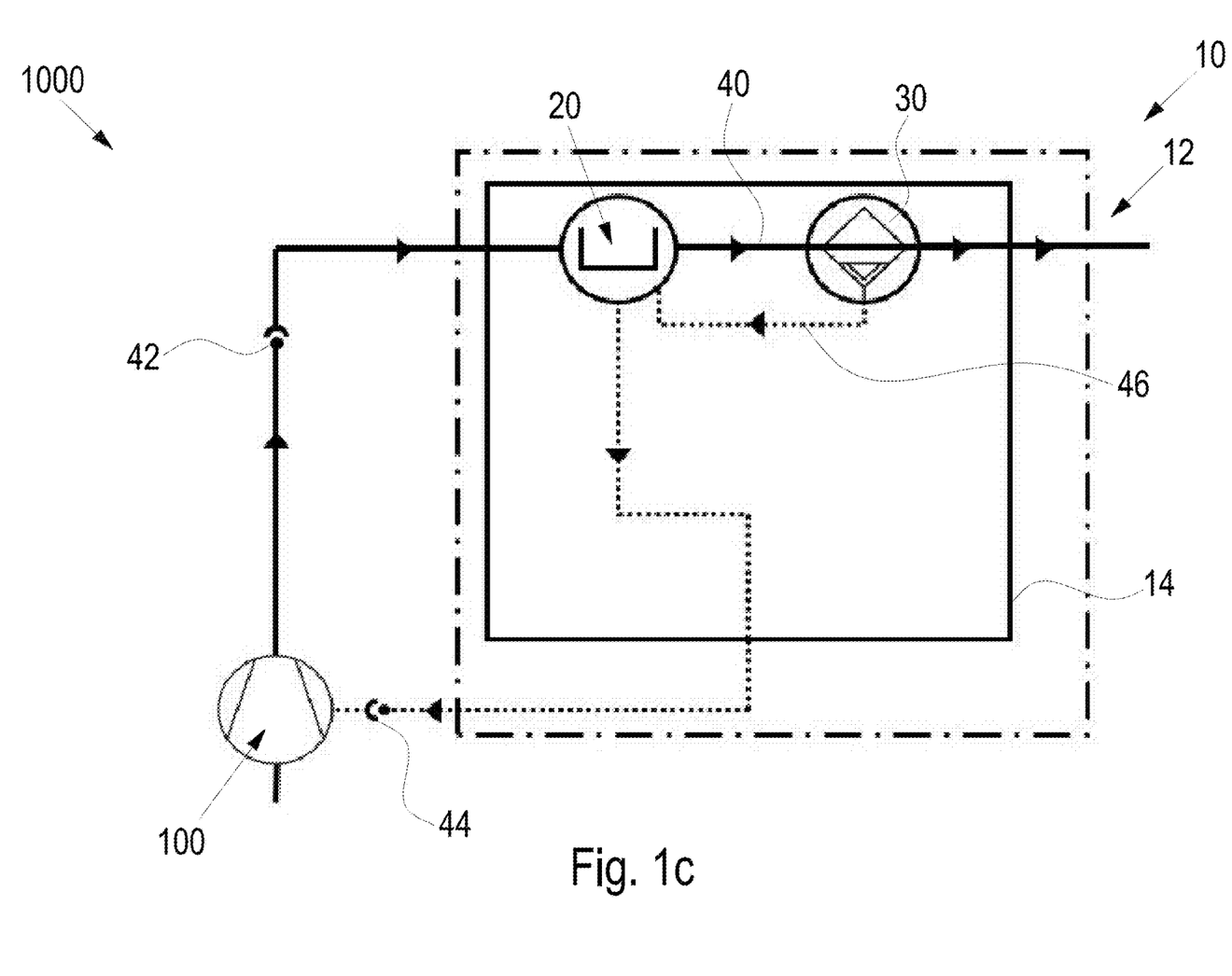

In contrast to the embodiment in FIG. 1a, the lubricant reservoir 20 has a lubricant separating system 58 in the high pressure chamber 50. In combination with or instead of the separation via the high pressure chamber, a lubricant separation by means of a lubricant separating system is effected which comprises e.g., a lubricant separator in particular a gravity lubricant separator and/or a filter and/or an impeller separator. FIG. 1c shows another embodiment of a vacuum pump system 1000 comprising a further embodiment of a lubricant receptacle 10, as well as a vacuum pump 100.

The embodiments in FIG. 1c again are embodiments substantially corresponding to those in FIG. 1a. The embodiments in FIG. 1c, however, are much simpler in design.

The gas of the vacuum pump flows into the lubricant reservoir 20 via the second gas connection 42 and from there into the lubricant separator 30 via the first gas connection 40. The gas escapes from the lubricant receptacle 10 through the exhaust 12.

The lubricant reservoir 20, which is illustrated only schematically, may be designed e.g., as a simple chamber, but may also have one or more elements and/or functions of other lubricant reservoirs 20, preferably of the other embodiments. Likewise, the lubricant separator 30, which is illustrated only schematically, may be a simple separator such as e.g., a filter. However, it is also possible that the lubricant separator 30 has one or more characteristics and/or components of other lubricant separators 30, preferably of the other embodiments.

The lubricant separated in the lubricant separator 30 is directed to the lubricant reservoir via a further lubricant connection 46. The lubricant collected in the lubricant reservoir 20 is guided to the vacuum pump 100 via a coupleable first lubricant connection 44.

In this instance, the lubricant receptacle 10 has only one housing 14 which accommodates the lubricant reservoir 20 and the lubricant separator 30. It is preferred that the coupling of the second gas connection 42 and/or the first Ic 44 is effected via the first housing 14, e.g., via a plug-in housing connection.

The lubricant receptacle 10 of FIGS. 1a to 1c show, for example, an embodiment of the above described first configuration.

Figure 2:
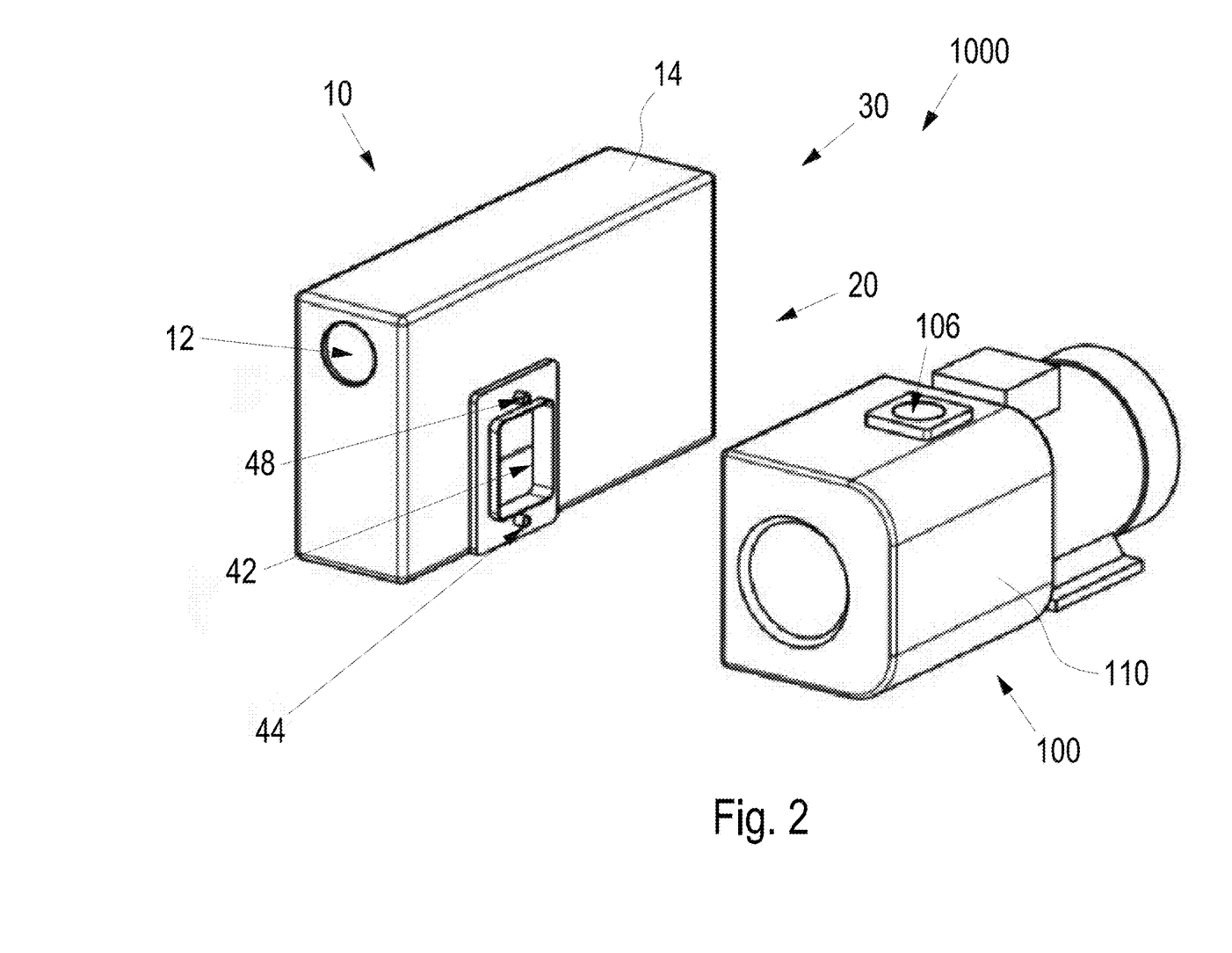

FIG. 2 is a perspective illustration of an embodiment of a vacuum pump system 1000 of the disclosure comprising an embodiment of a lubricant receptacle 10 of the present disclosure and a vacuum pump 100. The embodiments correspond substantially to the embodiments in FIGS. 1a to 1c.

The vacuum pump 100 has a gas inlet 106. The compressed gas is introduced into the lubricant receptacle 10 via a second gas connection 42 through a gas inlet not visible. The gas passes the lubricant reservoir 20, as well as the lubricant separator 30 and escapes from the lubricant receptacle 10 through an exhaust 12. Via a first lubricant connection 44, as well as an additional lubricant connection 48, the lubricant of the lubricant receptacle 10 is directed into the vacuum pump 100.

The connections 42, 44, 48 illustrated are coupleable plug-in connections.

Figure 3A:
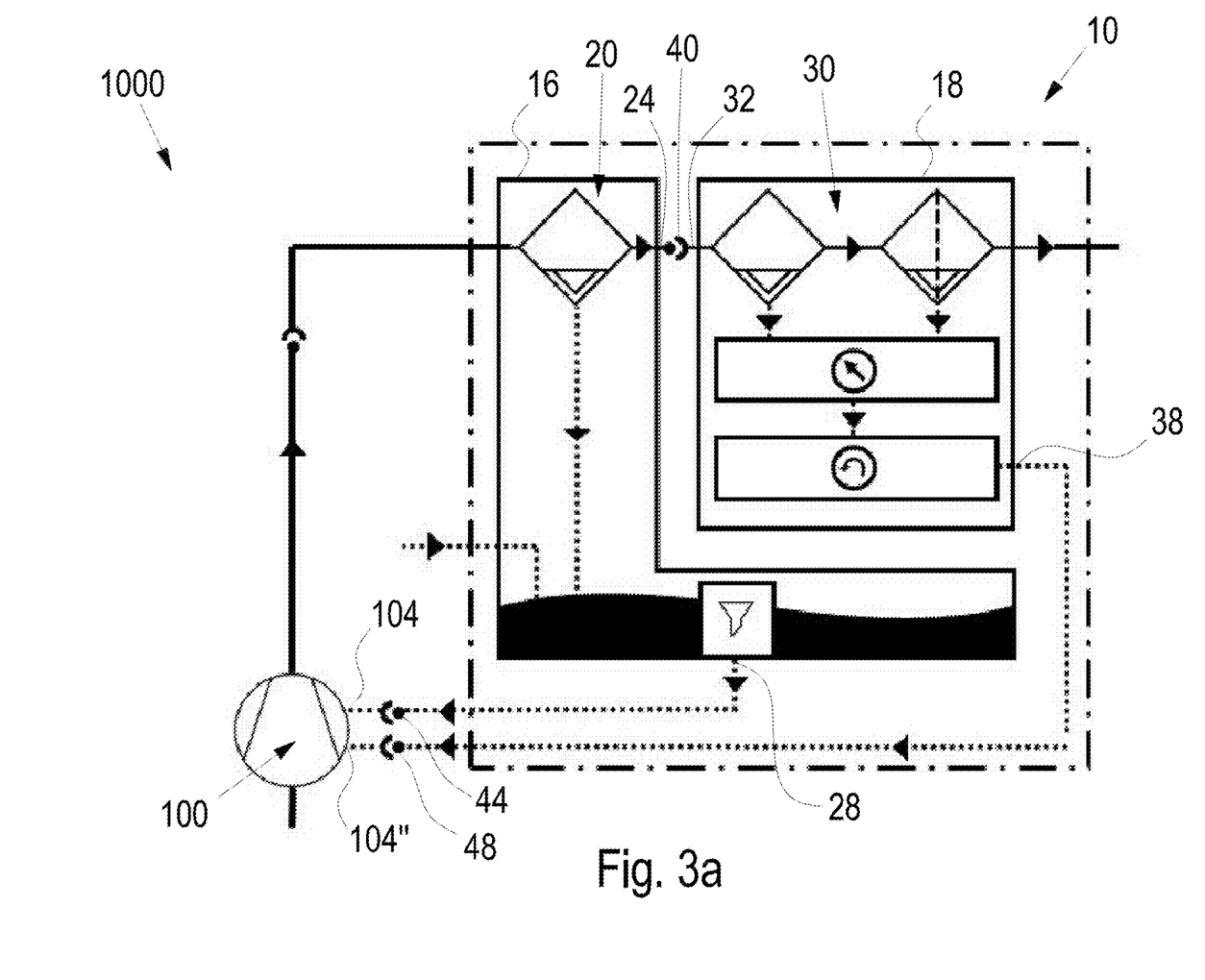

FIG. 3a illustrates another embodiment of a vacuum pump system 1000 comprising a further embodiment of a lubricant receptacle 10 of the disclosure and a vacuum pump 100. The embodiments in FIG. 3 correspond to a large extent to the embodiments in FIGS. 1a to 1c. Different from the embodiments in FIGS. 1a to 1c, the lubricant receptacle 10 in FIG. 3 has two housings 16, 18. The first housing 16 accommodates the lubricant reservoir 20, whereas the second housing 18 accommodates the lubricant separator 30. Thus, the first gas connection between the lubricant reservoir 20 and the lubricant separator 30 is designed as a coupleable connection. As illustrated, the embodiment further comprises two separate lubricant connections 44, 48 to the vacuum pump. The first lubricant connection 44 leads from the lubricant reservoir 20 to a first lubricant inlet 104' of the vacuum pump 100. The additional lubricant connection in turn leads from the lubricant separator 30 to a second lubricant inlet 104" of the vacuum pump 100. The two lubricant connections 44, 48 are each configured to be coupleable.

Figure 3B:
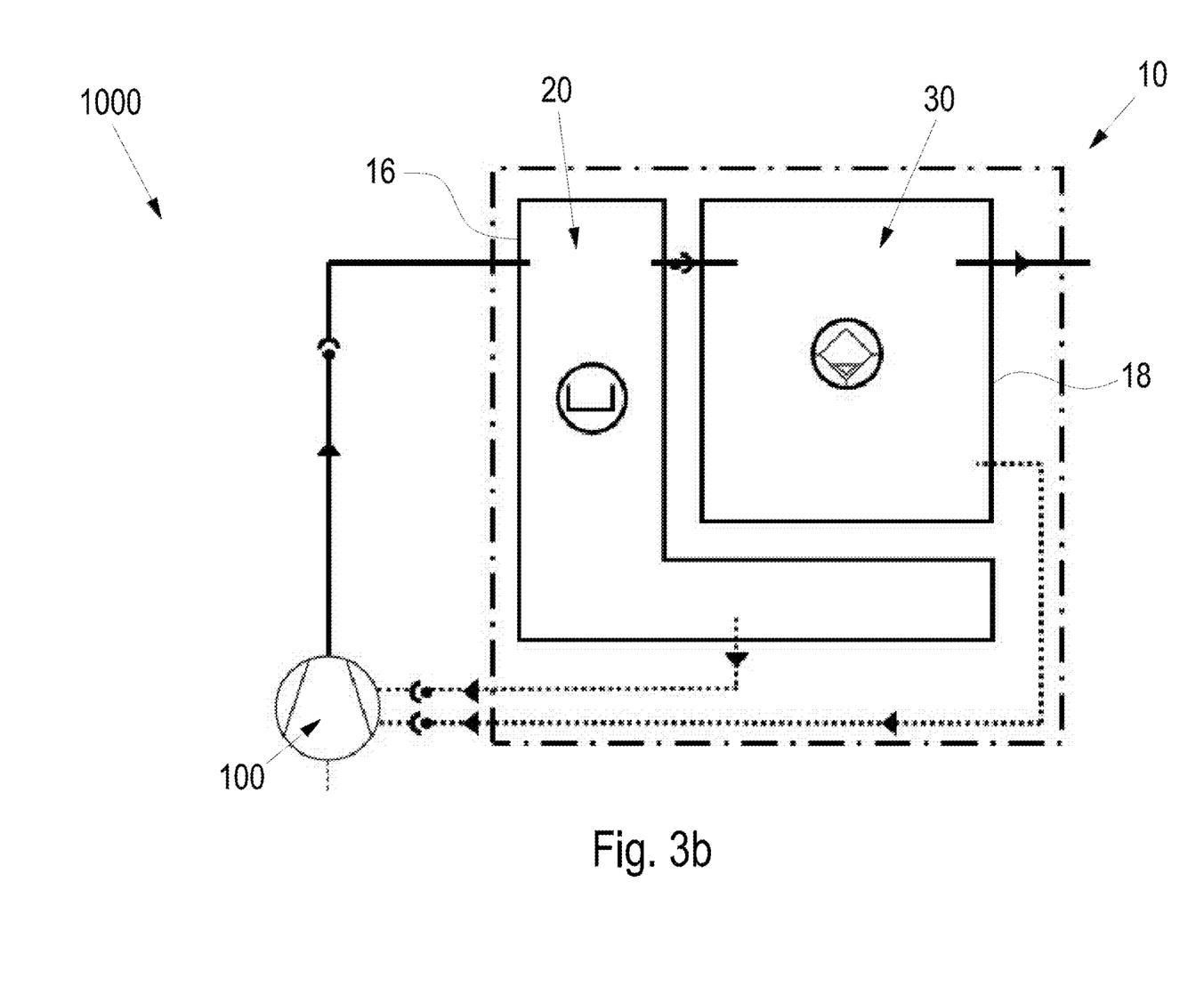

FIG. 3b illustrates further embodiments similar to the embodiment in FIG. 3a, wherein the same is (again) much simplified in design (similar to the embodiment in FIG. 1c).

In this instance, the housing 16 comprises a much simplified lubricant reservoir 20. The housing 18 in turn has a much simplified lubricant separator 30.

The lubricant receptacle 10 of FIGS. 3a and 3b show, for example, an embodiment of the above described second configuration.

Figure 4:
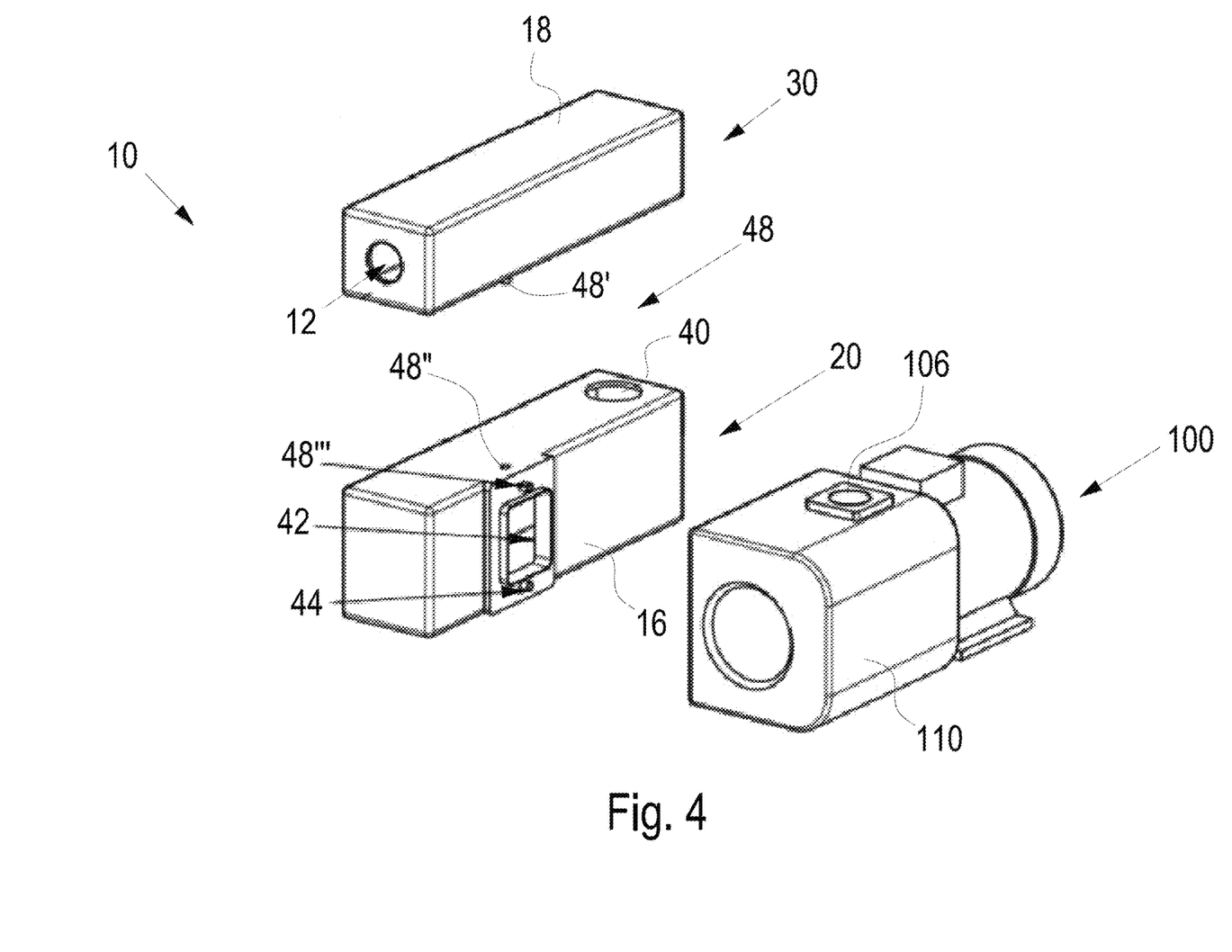

FIG. 4 shows another embodiment of a vacuum pump system 1000 of the disclosure comprising another embodiment of a lubricant receptacle 10 of the disclosure and a vacuum pump 100. Here, the embodiments illustrated are similar to the embodiments in FIGS. 3a and 3b and are based on the illustration in FIG. 2.

The lubricant reservoir 20 is formed in the housing 16, separately of the lubricant separator 30 in the housing 18, which in turn jointly form the lubricant receptacle 10. The first gas connection 40 between the lubricant reservoir 20 and the lubricant separator 30 is designed as a coupleable plug-in connection. Likewise, the additional lubricant connection 46 is designed a coupleable plug-in connection. Here, the lubricant separated in the lubricant separator 30 exits via the connecting part 48' and flows into the lubricant reservoir 20 via the connecting part 48", but is directly guided, e.g., via a line internal to the lubricant reservoir 30, into the vacuum pump 100 via the connecting part 48'". The vacuum pump 100 has a vacuum pump housing 110, which is a housing different from the housings 16, 18 of the lubricant reservoir 20 and the lubricant separator 30.

Figure 5A:
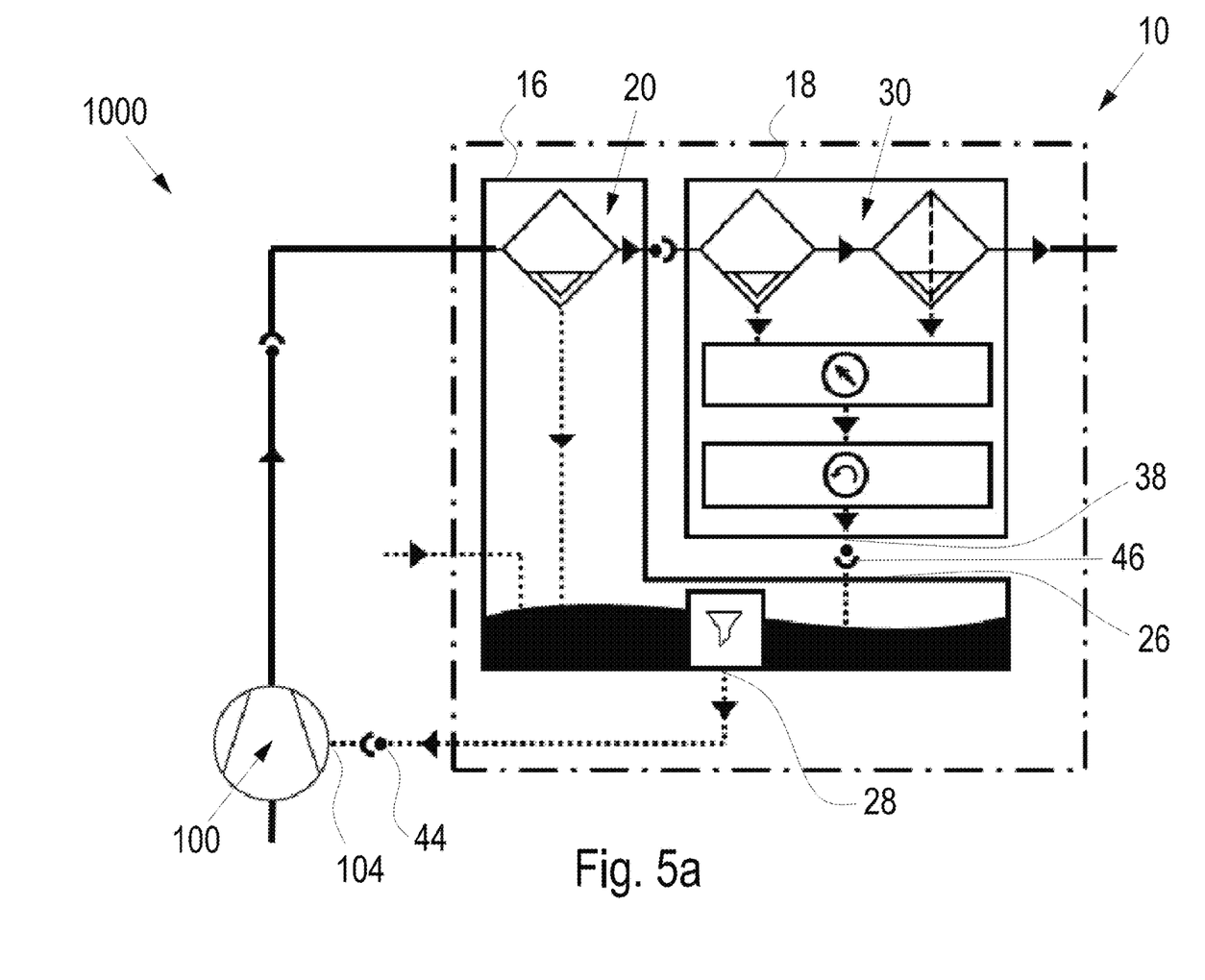
Figure 5B:
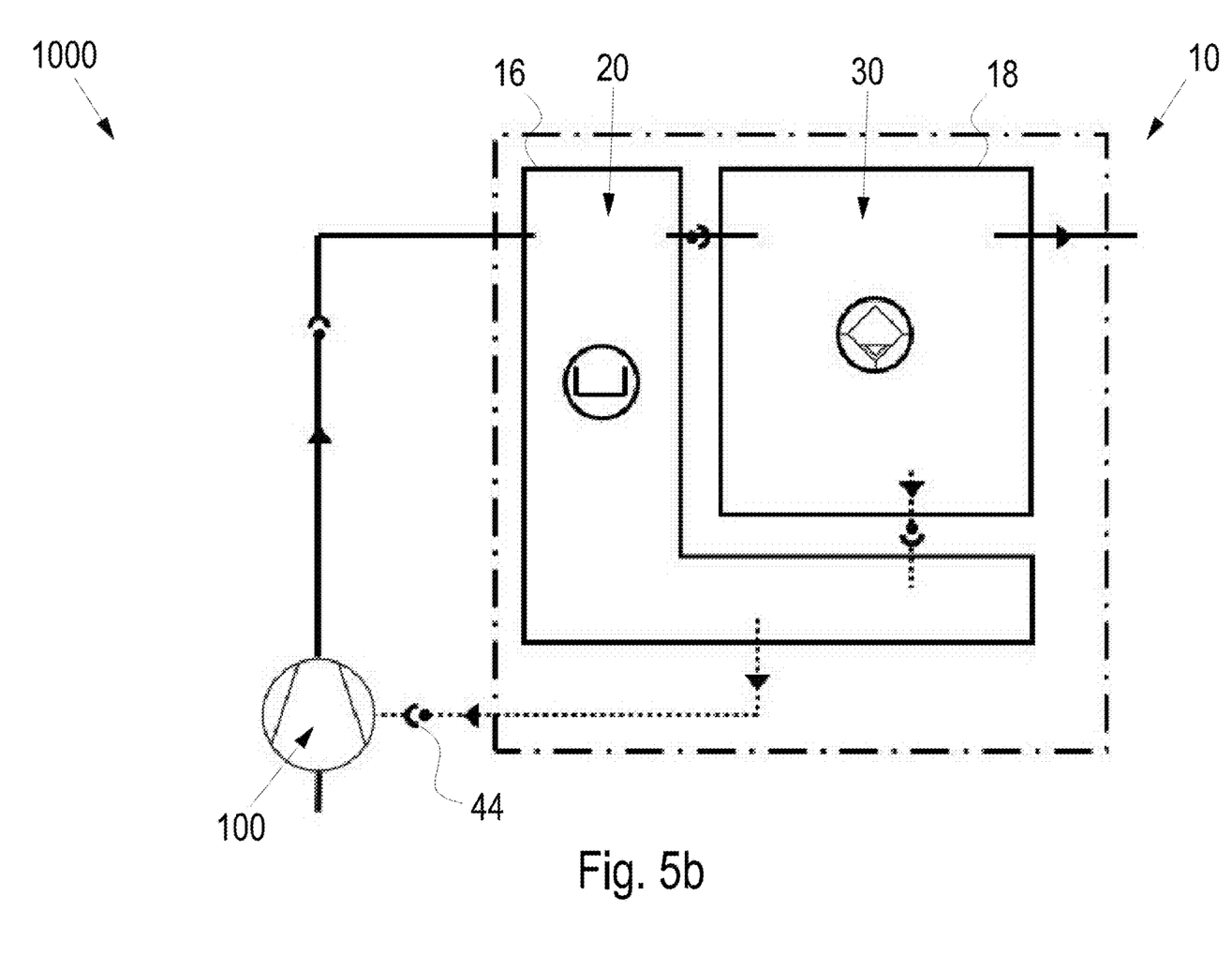
Figure 6:
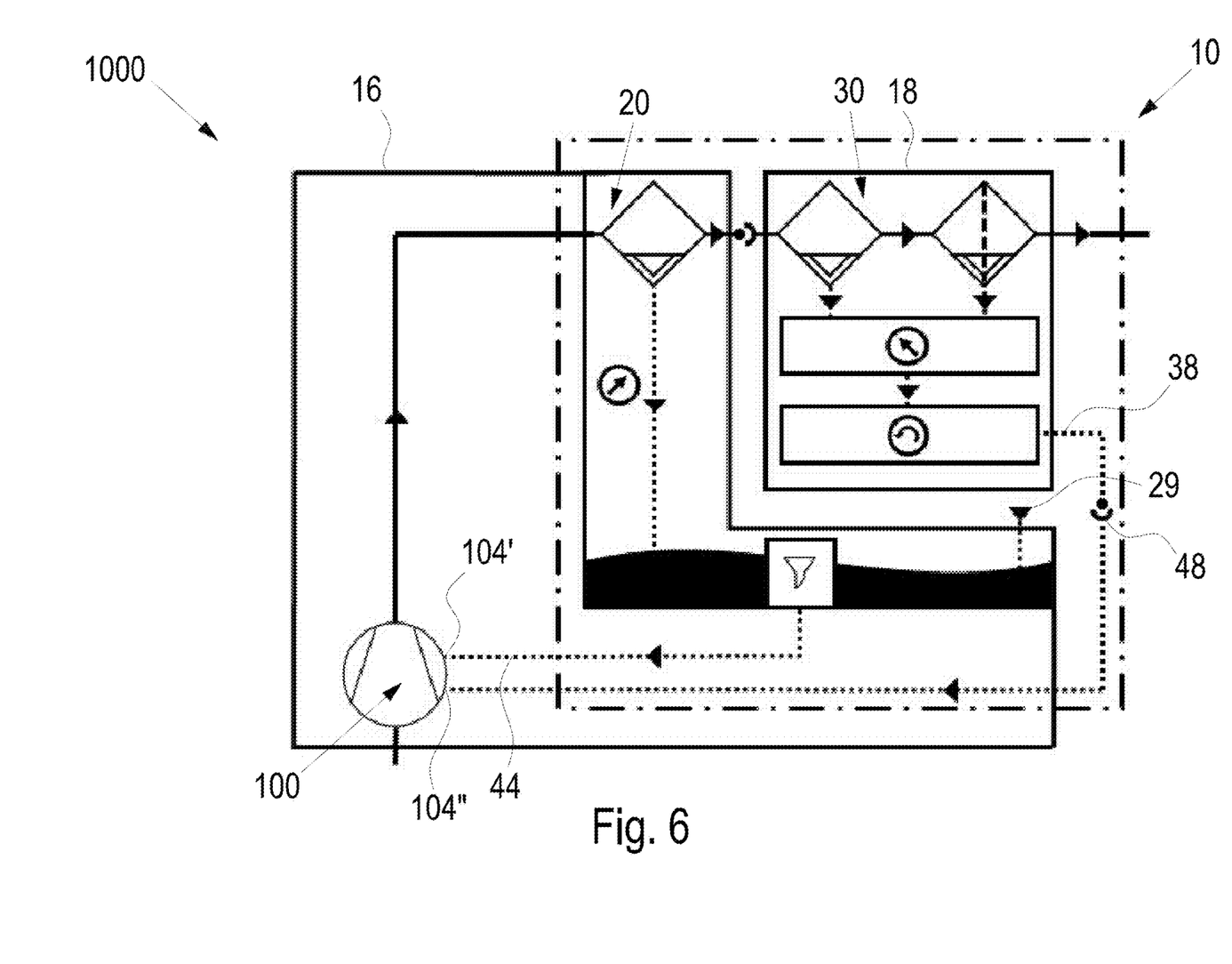

FIGS. 5a, 5b and 6 illustrate further embodiments of vacuum pump systems 1000 of the disclosure comprising embodiments of lubricant receptacles 10 of the disclosures and vacuum pumps 100, configured similar to the above embodiments, but corresponding to the variations thereof illustrated herein.

The lubricant receptacle 10 of FIGS. 5a and 5b show, for example, an embodiment of the above described fourth configuration. The lubricant receptacle 10 of FIG. 6 shows, for example, an embodiment of the above described third configuration.

All embodiments illustrated, as well as configurations described can be combined with each other.

What is claimed is:

1. Lubricant receptacle for a lubricant-sealed vacuum pump comprising:
 a lubricant reservoir having a gas inlet, a gas outlet, a lubricant outlet, as well as a lubricant inlet;
 a lubricant separator having a gas inlet, a gas outlet and a lubricant outlet;
 an exhaust from the lubricant receptacle connected in a gas-carrying manner with the gas outlet of the lubricant separator;
 a first gas connection between the gas outlet of the lubricant reservoir and the gas inlet of the lubricant separator;
 a second gas connection for connecting the gas inlet of the lubricant reservoir with the lubricant-sealed vacuum pump;
 a first lubricant connection for connection of the lubricant outlet of the lubricant reservoir with the lubricant-sealed vacuum pump;
 as well as
 a further lubricant connection between the lubricant outlet of the lubricant separator and the lubricant inlet of the lubricant reservoir and/or an additional lubricant connection for the connection of the lubricant outlet of the lubricant separator with the lubricant-sealed vacuum pump;
 wherein at least one of the first gas connection and the second gas connection are selectively coupleable; and
 wherein at least one of the first lubricant connection, the further lubricant connection, and the additional lubricant connection are selectively coupleable.

2. Lubricant receptacle of claim 1, wherein
 the first gas connection, the first lubricant connection, and the additional lubricant connection are selectively coupleable and the second gas connection, the first lubricant connection, and the further lubricant connection are fixedly connected, or
 the first gas connection, the second gas connection, the first lubricant connection, the further lubricant connection, and the additional lubricant connection are selectively coupleable, or
 the first gas connection, the second gas connection, the first lubricant connection, and the further lubricant connection are selectively coupleable and the additional lubricant connection is fixedly connected, or
 the first gas connection, the second gas connection, the first lubricant connection, and the additional lubricant connection are selectively coupleable and the further lubricant connection is fixedly connected, or
 the second gas connection, the further lubricant connection, and the additional lubricant connection are selectively coupleable and the first gas connection and the first lubricant connection are fixedly connected, or
 the second gas connection and the further lubricant connection are selectively coupleable and the first gas connection, the first lubricant connection, and the additional lubricant connection are fixedly connected, or
 the second gas connection and the additional lubricant connection are selectively coupleable and the first gas connection, the first lubricant connection, and the further lubricant connection are fixedly connected, or
 the first gas connection, the second gas connection, the first lubricant connection, and the additional lubricant connection are selectively coupleable, and the further lubricant connection is fixedly connected.

3. Lubricant receptacle of claim 1, further comprising:
 a housing accommodating the lubricant reservoir and the lubricant separator, or
 a first housing accommodating the lubricant reservoir and a second housing accommodating the lubricant separator.

4. Lubricant receptacle of claim 1, wherein the selectively coupleable of the at least one of the first gas connection and second gas connection and/or the selectively coupleable of the at least one of the first lubricant connection, the further lubricant connection, and the additional lubricant connection comprise a plug-in connection.

5. Lubricant receptacle of claim 1, wherein the selectively coupleable of the at least one of the first gas connection and second gas connection and/or the selectively coupleable of the at least one of the first lubricant connection, the further lubricant connection, and the additional lubricant connection are self-closing, when the connection with the lubricant-sealed vacuum pump is decoupled.

6. Lubricant receptacle of claim 1, wherein the lubricant reservoir further comprises:
a first chamber, which is connected with the lubricant inlet of the lubricant reservoir and/or the gas outlet of the lubricant reservoir,
a lubricant filter system connected with the lubricant outlet of the lubricant reservoir,
a lubricant tank connected with the first chamber and the lubricant filter system, and
a heat exchanger arranged between the lubricant filter system and the lubricant outlet of the lubricant reservoir.

7. Lubricant receptacle of claim 6, wherein the first chamber comprises an additional lubricant separator.

8. Lubricant receptacle of claim 1, wherein the lubricant separator further comprises:
at least one lubricant separating system connected with the gas inlet of the lubricant separator,
a gas lubricant filter connected with the at least one lubricant separating system and the gas outlet of the lubricant separator,
a lubricant recovery system connected with the at least one lubricant separating system and the gas lubricant filter, and
a second chamber which is arranged between the lubricant recovery system, and at least one of the gas lubricant filter and the at least one lubricant separating system.

9. Lubricant receptacle of claim 8, wherein the at least one lubricant separating system is a gravity lubricant separator or a filter or an impeller separator.

10. Lubricant receptacle of claim 8, wherein the lubricant recovery system comprises a heat exchanger and/or a lubricant tank.

11. A rotary vane vacuum pump system comprising:
the lubricant receptacle according to claim 1, and
the lubricant-sealed vacuum pump,
wherein the gas outlet of the lubricant-sealed vacuum pump is connected with the gas inlet of the lubricant reservoir via the second gas connection, and
the lubricant inlet of the lubricant-sealed vacuum pump is connected with the lubricant outlet of the lubricant reservoir via the first lubricant connection, and the lubricant inlet of the lubricant-sealed vacuum pump is connected with the lubricant outlet of the lubricant separator via the additional lubricant connection.

12. Vacuum pump system of claim 11, wherein the gas outlet of the lubricant-sealed vacuum pump and/or the lubricant inlet of the lubricant-sealed vacuum pump are self-closing when the connection with the lubricant receptacle is decoupled.

13. Lubricant receptacle of claim 1, wherein the lubricant reservoir further comprises:
a first chamber, which is connected with the lubricant inlet of the lubricant reservoir and/or the gas outlet of the lubricant reservoir, and
a lubricant tank connected with the first chamber.

14. Lubricant receptacle of claim 13, wherein the lubricant reservoir further comprises:
a lubricant filter system connected with the lubricant outlet of the lubricant reservoir, and
a heat exchanger arranged between the lubricant filter system and the lubricant outlet of the lubricant reservoir.

15. Lubricant receptacle of claim 1, wherein the lubricant reservoir further comprises:
a lubricant filter system connected with the lubricant outlet of the lubricant reservoir, and
a lubricant tank connected with the lubricant filter system.

16. Lubricant receptacle of claim 15, wherein the lubricant reservoir further comprises:
a heat exchanger arranged between the lubricant filter system and the lubricant outlet of the lubricant reservoir.

17. Lubricant receptacle of claim 1, wherein the lubricant separator further comprises:
at least one lubricant separating system connected with the gas inlet of the lubricant separator,
a lubricant recovery system connected with the at least one lubricant separating system, and
a second chamber which is arranged between the lubricant recovery system, and the at least one lubricant separating system.

18. Lubricant receptacle of claim 1, wherein the lubricant separator further comprises:
a gas lubricant filter connected with the gas outlet of the lubricant separator.

19. Lubricant receptacle of claim 18, wherein the lubricant separator further comprises:
a lubricant recovery system connected with the gas lubricant filter, and
a second chamber which is arranged between the lubricant recovery system and the gas lubricant filter.

* * * * *